Oct. 18, 1927.
S. E. ALLEN
1,645,979
MEANS FOR GRADUALLY SPEEDING UP ENGINE DRIVEN MACHINES
Filed Jan. 20, 1926
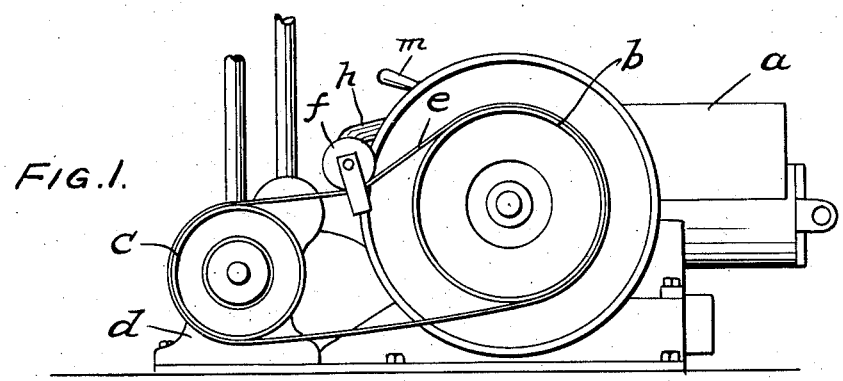
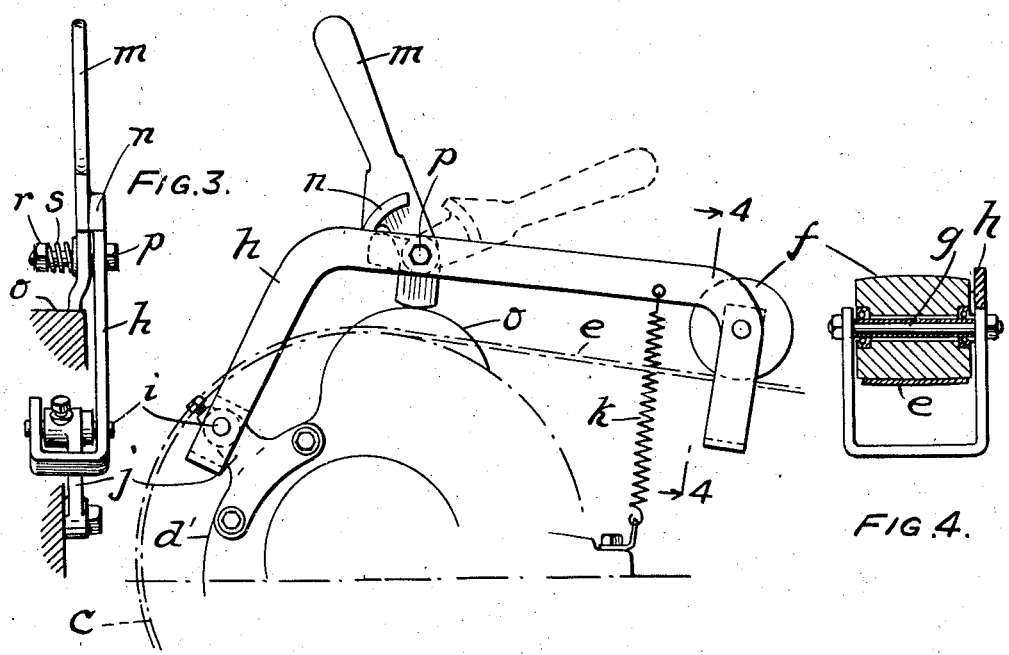
INVENTOR
Samuel E. Allen
BY
Busser and Harding
ATTORNEYS.
WITNESS:

Patented Oct. 18, 1927.

1,645,979

UNITED STATES PATENT OFFICE.

SAMUEL E. ALLEN, OF POUGHKEEPSIE, NEW YORK, ASSIGNOR TO THE DE LAVAL SEPARATOR COMPANY, OF NEW YORK, N. Y., A CORPORATION OF NEW JERSEY.

MEANS FOR GRADUALLY SPEEDING UP ENGINE-DRIVEN MACHINES.

Application filed January 20, 1926. Serial No. 82,531.

In operating pumps or other driven mechanism from engines or motors, it is desirable, in starting, to provide yielding or non-positive driving means between the driving element and the driven element so as to avoid throwing an excess load on the engine. This is desirable, for example, where a pump of a milking machine is driven from an internal combustion engine.

The object of my invention is to provide an endless belt driving connection between the pulley driven by an engine or other motor and the pulley driving a pump or other driven device, which will be manually controllable so that the belt may be slackened at the beginning of the operation to allow for free slippage of the belt and may be gradually tightened to allow less free slippage and thus speed up the pump gradually, until the belt has been so tightened that the drive will be practically positive and the pump will be driven at full speed.

A preferred embodiment of the invention is shown in the accompanying drawings, in which—

Fig. 1 is a side view of an engine and a pump of a small unit, together with driving connections between them embodying my invention, the manually controllable mechanism being mounted on the engine.

Fig. 2 is a side view, on a larger scale, looking in the same direction, of part of the driving connections embodying my invention, the manually controllable mechanism being mounted on the pump.

Fig. 3 is an end view of the belt-tightening lever and the manually operable lever for regulating the position of the belt-tightening lever.

Fig. 4 is a view, partly in section, of the belt-tightening pulley and the end of the lever carrying the pulley.

A shaft driven by the engine $a$ carries a pulley $b$ which, through a belt $e$, drives a pulley $c$ on the shaft of a rotary pump $d$, Fig. 1, or $d'$, Fig. 2. A belt-tightening pulley $f$ is mounted to turn on an axle $g$ secured between the arms formed by the U-shaped end of a bent lever $h$. The opposite end of lever $h$ is also U-shaped. The arms of the latter U are fulcrumed on trunnions $i$ carried on the end of a bracket $j$ secured, in the form shown in Fig. 2, to the pump frame. A spring $k$ connects lever $h$ with the pump frame and tends to draw down lever $h$ and impose a maximum tension on the belt.

Pivoted between its ends on lever $h$ is a hand operable lever $m$, the short arm of which engages an abutment or cam $o$, shown in Fig. 2, on the pump frame. Lever $m$ carries a laterally extending projection $n$. When lever $m$ is in the position shown in Fig. 2, lever $h$ and pulley $f$ are held up against the tension of spring $k$ and pulley $f$ and belt $e$ is so slackened that it cannot effectively transmit power from the engine to the pump. As lever $m$ is moved toward its broken line position, it permits spring $k$ to gradually apply increasing tension on belt $e$ until, when lever $m$ reaches the extreme position shown in broken lines, the maximum tension is imposed on belt $e$ and the driving connection between the engine and the pump becomes positive.

The function of projection $n$ is to act as a stop to limit the throw of lever $m$ in both directions.

Lever $h$ carries a bolt $p$ on which is threaded a nut $r$ between which and lever $m$ is confined a spring $s$. The spring tends to hold lever $m$ in any position to which it is moved so that appreciable manual power is required to manipulate lever $m$.

In Fig. 1, the same mechanism, part of which is shown, is applied to the engine frame.

When power is first applied to the pump, the inertia of the latter is such that with a positive driving connection from the engine, the load imposed on the engine is excessive. Further, in cold weather, the pump does not run easily until the lubricating oil is heated so as to flow readily, and this imposes a still greater load on the engine in starting. It is therefore desirable to provide for free belt slippage in starting and to allow progressively less slippage as the pump speeds up. By slowly moving lever $m$ from the full line position to the broken line position, belt $f$ may be made to serve the same purpose as a friction clutch pulley.

In claiming an engine and pump as a part of the combination, I mean to include equivalents.

Having now fully described my invention, what I claim and desire to protect by Letters Patent is:

1. The combination with an engine, a pulley driven thereby, a pump, a pulley driving the pump, and an endless driving belt between the pulleys, of a pivotally mounted lever, a belt-tightening pulley carried thereby, a spring tending to move the belt-tightening pulley into position to impose a maximum tension on the belt, a manually operable lever pivoted on the pulley-carrying lever, and an abutment adapted to be engaged by the manually operable lever and hold the belt-carrying lever, against the tension of its spring, in different positions adapted to more or less slacken the belt.

2. The combination with an engine, a pulley driven thereby, a pump, a pulley driving the pump, and an endless driving belt between the pulleys, of a lever pivotally mounted at one end, a belt-tightening pulley carried by the other end of the lever, a spring tending to move the belt-tightening pulley into position to impose a maximum tension on the belt, a manually operable lever pivoted to and between the ends of the pulley-carrying lever, and an abutment; the manually operable lever being pivoted near one end, its short arm being adapted to engage said abutment and thereby hold the belt-carrying lever in position to hold the belt-tightening pulley in position, against the tension of said spring, to allow maximum slackening of the belt, the manually operable lever being movable into position to change the angular position of its short end relative to said abutment and thereby allow said spring to move the belt-tightening pulley into position to impose a predetermined tension on the belt.

3. The combination with an engine, a pulley driven thereby, a pump, a pulley driving the pump, and an endless driving belt between the pulleys, of a pivotally mounted lever, a belt-tightening pulley carried thereby, a spring tending to move the belt-tightening pulley into position to impose a maximum tension on the belt, a manually operable lever pivoted on the pulley-carrying lever, an abutment adapted to be engaged by the manually operable lever and hold the belt-carrying lever in different positions varying with the angular position of the manually operable lever relative to the abutment, and a stop on the manually operable lever adapted, as the manually operable lever is moved to an extreme position, to engage the pulley-carrying lever and arrest the movement of the manually operable lever.

4. The combination with an engine, a pulley driven thereby, a pump, a pulley driving the pump, and an endless driving belt between the pulleys, of a lever U-shaped at both ends, supporting means extending between the arms of the U at one end of said lever and on which said lever is pivoted, a belt-tightening pulley carried between the arms of the U at the other end of said lever, a spring tending to move said lever into position to cause said belt-tightening pulley to impose a maximum tension on the belt, a fixed abutment, and a manually operable lever pivoted near one of its ends to and between the ends of the pulley-carrying lever; the short arm of the manually operable lever adapted to engage said abutment and thereby hold the pulley-carrying lever, against the tension of said spring, in position to allow maximum slackening of the belt, the manually operable lever being movable into position to vary the angular position of its short end relatively to said abutment and thereby allow said spring to move the belt-tightening pulley into positions imposing variable tension on the belt.

In testimony of which invention, I have hereunto set my hand, at Poughkeepsie, New York, on this 14th day of January, 1926.

SAMUEL E. ALLEN.